United States Patent
Collias et al.

(10) Patent No.: US 9,622,563 B2
(45) Date of Patent: Apr. 18, 2017

(54) PLASTIC PACKAGES FOR DISPENSING AEROSOL PRODUCTS HAVING IMPROVED CRAZING RESISTANCE AND SUSTAINABILITY

(71) Applicant: The Procter & Gamble Company, Cincinnati, OH (US)

(72) Inventors: Dimitris Ioannis Collias, Mason, OH (US); John Andrew McDaniel, Middletown, OH (US); Patti Jean Kellett, Cincinnati, OH (US); Emily Charlotte Boswell, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 281 days.

(21) Appl. No.: 13/804,574

(22) Filed: Mar. 14, 2013

(65) Prior Publication Data

US 2013/0270295 A1 Oct. 17, 2013

Related U.S. Application Data

(60) Provisional application No. 61/624,586, filed on Apr. 16, 2012.

(51) Int. Cl.
 *B65D 35/28* (2006.01)
 *B65D 83/00* (2006.01)
 (Continued)

(52) U.S. Cl.
 CPC ............... *A45D 34/00* (2013.01); *B32B 1/02* (2013.01); *B32B 27/08* (2013.01); *B65D 1/0207* (2013.01);
 (Continued)

(58) Field of Classification Search
 CPC ......... C08L 67/02; B65D 83/38; B65D 83/40; B65D 83/055; B65D 83/0055;
 (Continued)

(56) References Cited

U.S. PATENT DOCUMENTS 3,885,155 A 5/1975 Anbar
4,427,884 A 1/1984 Anbar et al.
(Continued)

FOREIGN PATENT DOCUMENTS

JP 2001-122364 5/2001
JP 2008 291244 A 12/2008
(Continued)

OTHER PUBLICATIONS

International Search Report and Written Opinion dated Apr. 7, 2014.
(Continued)

*Primary Examiner* — Frederick C Nicolas
(74) *Attorney, Agent, or Firm* — Jeffrey V Bamber; Brent M. Peebles

(57) ABSTRACT

A plastic package for dispensing a product in aerosol form having improved crazing resistance and sustainability is disclosed. The plastic package comprises a bottle having a delivery device, a valve to control flow, and a stable plastic package that holds the product when sealed using the valve. In one embodiment, at least a portion of the plastic package comprises PEF.

22 Claims, 2 Drawing Sheets

(51) Int. Cl.

| | | |
|---|---|---|
| *A45D 34/00* | (2006.01) | |
| *B65D 1/40* | (2006.01) | |
| *B32B 1/02* | (2006.01) | |
| *B32B 27/08* | (2006.01) | |
| *B65D 41/00* | (2006.01) | |
| *B65D 83/38* | (2006.01) | |
| *B65D 83/40* | (2006.01) | |
| *C08G 63/181* | (2006.01) | |
| *C08L 67/02* | (2006.01) | |
| *B65D 1/02* | (2006.01) | |
| *B65D 23/14* | (2006.01) | |
| *B65D 41/02* | (2006.01) | |
| *A45D 34/02* | (2006.01) | |

(52) U.S. Cl.
CPC ............... *B65D 1/40* (2013.01); *B65D 23/14* (2013.01); *B65D 41/00* (2013.01); *B65D 41/02* (2013.01); *B65D 83/0055* (2013.01); *B65D 83/38* (2013.01); *B65D 83/40* (2013.01); *C08G 63/181* (2013.01); *C08L 67/02* (2013.01); *A45D 34/02* (2013.01); *Y10T 428/1352* (2015.01); *Y10T 428/1397* (2015.01)

(58) Field of Classification Search
CPC ........ B65D 1/0207; B65D 1/40; B65D 23/14; B65D 41/00; B65D 41/02; Y10T 428/1352; Y10T 428/1397; C08G 63/181; B32B 1/02; B32B 27/08; A45D 34/00; A45D 34/02
USPC ...... 222/95, 105, 402.1, 402.22–402.23, 394
See application file for complete search history.

(56) References Cited

U.S. PATENT DOCUMENTS

| | | | |
|---|---|---|---|
| 4,973,841 A | | 11/1990 | Purser |
| 5,199,615 A * | | 4/1993 | Downing et al. ............. 222/397 |
| 5,265,765 A * | | 11/1993 | Maier ........................... 222/105 |
| 5,438,194 A | | 8/1995 | Koudijs et al. |
| 5,661,299 A | | 8/1997 | Purser |
| 7,028,866 B2 * | | 4/2006 | Kunesh et al. ............. 222/402.1 |
| 7,448,517 B2 * | | 11/2008 | Shieh et al. .................... 222/394 |
| 7,487,893 B1 * | | 2/2009 | Greer, Jr. ............... B65D 83/30 222/1 |
| 7,721,920 B2 * | | 5/2010 | Ruiz De Gopegui et al. ....................... 222/402.13 |
| 7,985,788 B2 | | 7/2011 | Shinagawa et al. |
| 8,016,167 B2 * | | 9/2011 | Tomkins .............. B65D 83/206 222/402.13 |
| 8,025,189 B2 * | | 9/2011 | Salameh .................... 222/402.1 |
| 8,083,064 B2 | | 12/2011 | Boswell et al. |
| 8,276,788 B2 * | | 10/2012 | Lyda .................... B65D 83/205 222/146.3 |
| 8,276,832 B2 * | | 10/2012 | Nelson ................ B65D 83/206 222/402.13 |
| 8,631,970 B2 * | | 1/2014 | Chan et al. ...................... 222/94 |
| 8,083,064 C1 | | 5/2014 | Boswell et al. |
| 2003/0215400 A1 * | | 11/2003 | Schroeder et al. ............. 424/47 |
| 2005/0230418 A1 * | | 10/2005 | Campbell et al. .............. 222/95 |
| 2008/0272145 A1 | | 11/2008 | Nimmo et al. |
| 2009/0124763 A1 * | | 5/2009 | Matsuda ................ C08G 63/16 525/437 |
| 2009/0194191 A1 | | 8/2009 | Turgeman |
| 2011/0017701 A1 * | | 1/2011 | Soliman ........................ 215/381 |
| 2011/0120902 A1 | | 5/2011 | Boswell et al. |
| 2011/0295400 A1 | | 12/2011 | Samain |
| 2012/0064136 A1 * | | 3/2012 | Baker et al. ................... 424/401 |
| 2012/0292338 A1 * | | 11/2012 | Smith ............................ 222/95 |
| 2013/0270212 A1 | | 10/2013 | Collias et al. |
| 2014/0336349 A1 * | | 11/2014 | Sipos et al. ................... 528/285 |

FOREIGN PATENT DOCUMENTS

| | | |
|---|---|---|
| JP | 2009-215467 | 9/2009 |
| WO | WO 2007/052847 A1 | 5/2007 |
| WO | WO 2009/155086 A2 | 12/2009 |
| WO | WO 2013/110791 A1 | 8/2013 |
| WO | WO 2013/110794 A1 | 8/2013 |

OTHER PUBLICATIONS

Subcommittee D20.10, ASTM D256-10, Standard Test Methods for Determining the Izod Pendulum Impact Resistance of Plastics (available for order on-line 2014; a stand-alone publication; therefore, page and volume numbers not applicable), ASTM International, West Conshohocken, PA, 2010, www.astm.org.

Subcommittee D20.10, ASTM D638-10, Standard Test Method for Tensile Properties of Plastics (available for order on-line 2014; a stand-alone publication; therefore, page and volume numbers not applicable), ASTM International, West Conshohocken, PA, 2010, www.astm.org.

Subcommittee D20.96, ASTM D6866-12, Standard Test Methods for Determining the Biobased Content of Solid, Liquid, and Gaseous Samples Using Radiocarbon Analysis (available for order on-line 2014; a stand-alone publication; therefore, page and volume numbers not applicable), ASTM International, West Conshohocken, PA, 2012, www.astm.org.

International Search Report and Written Opinion dated Jul. 18, 2013.

Office Actions for U.S. Appl. No. 13/804,672, dated Feb. 5, 2014 and Mar. 28, 2014.

* cited by examiner

PLASTIC PACKAGES FOR DISPENSING AEROSOL PRODUCTS HAVING IMPROVED CRAZING RESISTANCE AND SUSTAINABILITY

TECHNICAL FIELD

The present invention relates to plastic packages for dispensing products in an aerosol form comprising PEF and having improved crazing resistance which will reduce the likelihood of cracking of the package. The present invention also provides a means for improving the sustainability of a plastic package by comprising PEF, by increasing the amount of renewable content in the package.

BACKGROUND OF THE INVENTION

Aerosol bottles formed from plastic materials have been proposed as a new alternative to metal bottles. Plastic bottles would give manufacturers increased freedom in developing unique canister shapes, developing clear packages, giving an improved sustainability profile vs. metal and lowering manufacturing costs. Poly(ethylene terephthalate) (PET) has been suggested as a useful plastic material for aerosol bottles, since it is clear and can be recycled. However, limonene and other perfume raw materials (prms), as well as hydrocarbon propellants and other formula ingredients (or even just water in some cases, with different results depending on the pH of the water), can diffuse into PET, especially in high pressure environments, and lower its crazing initiation stress. As a result of that, these chemicals can cause crazing of PET in the neck and shoulder regions of an aerosol bottle where the tensile stresses, due to the presence of the pressurized propellant and small radii of curvature, exceed the crazing initiation stress. Crazing is more predominant in these regions, since they tend to be more amorphous than in the more highly crystalline and stretched regions of the bottle, where the PET molecules are more aligned and diffusivity of the ingredients is lower. This crazing of PET can progress into cracking (particularly at higher strains and when exposed to substances, such as bleach, which can cause hydrolytic cracking) and cause integrity problems in aerosol bottles and is potentially dangerous: a weakened plastic aerosol could lead to a compromised bottle that could release the gas/product contained within uncontrollably and thus be unacceptable from a product safety viewpoint.

Therefore, a need still exists for an aerosol bottle that can be formed from a recyclable plastic material that has better resistance to crazing than PET.

SUMMARY OF THE INVENTION

The present invention provides a plastic package for dispensing a product in aerosol form comprising poly(ethylene 2,5-furandicarboxylate) (PEF) and having improved crazing resistance and sustainability. The plastic package comprises a bottle having a delivery device, a valve to control flow and a stable plastic package that holds the product when sealed using the valve. At least a portion of the plastic package comprises PEF. In one embodiment, the plastic package further comprises a bag connected to the valve. The bag contains a liquid, gel, suspension, solution, paste, or foam product. In a preferred embodiment, the bag comprises PEF.

In another embodiment, the bottle has a neck region and the neck region comprises PEF. The bottle may further comprise a base cup, and the base cup may comprise PEF. In addition, the bottle may further comprise a label, and the label may comprise PEF. In another embodiment, the bottle may further comprise a cap, and the cap may comprise PEF. In another embodiment, the bottle may further comprise a trigger, and the trigger may comprise PEF.

In another embodiment, the product comprises a propellant, and the propellant (i.e., liquid at that package pressure that can readily be vaporized into pressurized gas) is selected from the group consisting of dimethylether, 1,1-difluoroethane, 1,1,1,2- tetrafluoroethane, butane, isobutane, propane, isopentane, pentane, nitrous oxide, and other propellants, or combinations thereof. Alternatively, the bottle may be pressurized using an inert gas, such as carbon dioxide, nitrogen, argon, air. In another embodiment, the bottle may be pressurized using a combination of a propellant and an inert gas. As used herein, the term "propellant" includes propellant and inert gas.

In another embodiment, the plastic package is substantially clear. Preferably, the plastic package is made from PEF. In one embodiment, the plastic package further comprises strengthening materials selected from the group consisting of glass fibers, glass spheres, and mixtures thereof. In another embodiment, from about 10% to 100% of the plastic package comprises bio-based content. Alternatively, from about 20% to 100% of the plastic package comprises bio-based content. In another embodiment, from about 30% to 100% of the plastic package comprises bio-based content. Additionally, the PEF may be blended with farnesene.

In an alternative embodiment, the plastic package is made from a blend of PEF and one or more other materials selected from the group consisting of PET, polyester, polyamide, polycarbonate, polyoxymethylene, polyacrylonitrile, polyoelofin, fluoropolymers, poly(butylene succinate), or combinations thereof.

In one embodiment, the bottle is formed from multiple layers of polymer material. Preferably, at least one of the multiple layers is a barrier material. In one embodiment, the bottle comprises one or more colored pigments or dyes. In another embodiment, these materials could all be available in recycled or regrind form, as well as in virgin form.

DETAILED DESCRIPTION OF THE INVENTION

Figure 1:
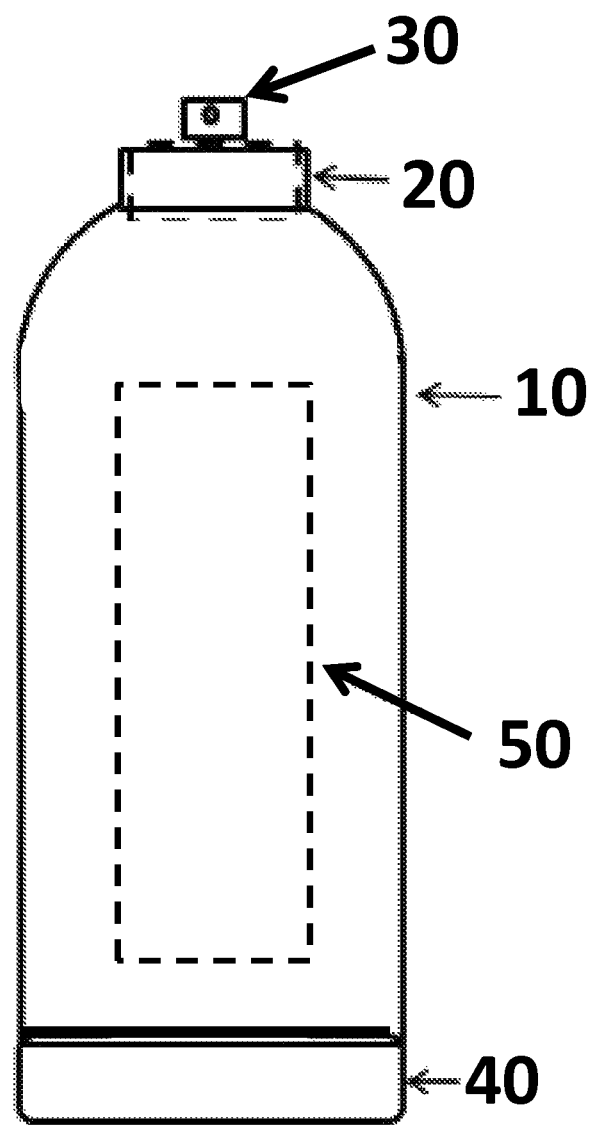
FIG. 1 is a side view of one embodiment of the plastic package of the present invention.

These and other essential elements or limitations of the product formula with a fire hazard of level 1 or level 2 and are a stable plastic package are described in detail hereinafter.

"Stable packages" are defined based on their behavior upon storage at 40° C. for 3 months. A stable package will not show visible discoloration or hazing upon said storage or have more than 1.5% weight loss or show more than a 2% change in a given dimension (i.e., diameter, width, depth, length, or crimp height) or rupture or result in a Boiling Liquid Expanding Vapor Explosion (BLEVE). Other optional features of a "stable package" include not exhibiting crazing and evidence that relaxation enthalpy as measured by differential scanning calorimetry (DSC) has stabilized.

The term "plastic" refers to any synthetic or organic materials that can be molded or shaped, generally when heated, and then hardened into a desired form including, but not limited to, polymers, resins, and cellulose derivatives.

The term "plastic package" refers to the container vessel of the aerosol package being made substantially of plastic. The sealing valve and actuator of the package may or may not necessarily be made substantially of plastic.

The term "renewable material" means the material has been derived from a renewable resource (i.e., something that can be restored and replenished by nature in a period of time that is compatible with human use).

All percentages, parts and ratios as used herein are by weight of the total composition, unless otherwise specified. All such weights as they pertain to listed ingredients are based on the active level and, therefore, do not include solvents or by-products that may be included in commercially available materials, unless otherwise specified.

The pressurized compositions of the present invention can comprise, consist of, or consist essentially of the essential elements and limitations of the invention described herein, as well as any additional or optional ingredients, components, or limitations described herein.

PEF, particularly monolayer PEF, does not suffer from the crazing problem that PET suffers with limonene, other prms, propellants, and other ingredients. Aerosol bottles made from monolayer PEF (homopolymer/copolymer) or blends of PEF and PET or layered constructions of PEF (inside) and PET have lower crazing or no crazing at all present in the neck and shoulder regions.

PEF is produced by a condensation reaction of furan-1, 4-dicarboxylic acid (FDCA) and ethylene glycol (EG; also called monoethylene glycol or MEG), analogous to the condensation reaction between EG and terephthalic acid used to make PET. FDCA can be prepared from sugar by the acid dehydration to form hydroxy methyl furfural (HMF) or its derivatives. These derivatives can then be oxidized to FDCA. Ethylene glycol can be derived conventionally from petroleum resources leading to a partially-renewable PEF (75% of carbons renewably sourced) or ethylene glycol can also be sourced from sugar from plants to give a fully renewable PEF (100% of carbons renewably sourced). Sugar-sourced EG can be made by fermenting the sugar to give ethanol, dehydrating the ethanol to give bio-ethylene, oxidizing the ethylene to give bio-ethylene oxide, and hydrolyzing the bio-ethylene oxide to give bio-EG.

Monolayer PEF is a preferred material for the plastic package of the present invention. Monolayer PEF is more resistant than PET to caustic solutions such as peroxide and other bleaches that can cause hydrolytic cracking (not just crazing) across the entire bottle. In addition, monolayer PEF is able to meet the product and propellant loss specification across the necessary shelf life time for the plastic aerosol, whereas PET alone cannot.

In one embodiment, the plastic package is formed from a multilayer structure of polymer materials. A multilayer structure will produce further improvements to crazing resistance and increase the package lifetime. Preferably, at least one layer of the multilayer structure is PEF. Most preferably, PEF is the inside material in the multilayer structure, ensuring higher crazing resistance in the areas under tensile stress.

While not wishing to be bound by theory, the better barrier and integrity properties of PEF (homopolymer/copolymer) vs. PET with respect to solvents prms, such as limonene, water, and other chemicals, may be due to the higher polarity of the oxygen containing aromatic furan ring compared to the analogous all hydrocarbon aromatic ring of terephthalic acid and to the higher crystallinity of PEF than PET. These differences between PET and PEF may alter interactions between PEF and ingredients contained by it so as to reduce or even eliminate the crazing in a PEF bottle and significantly reduce water and propellant loss from a product. Improved barrier properties, reduced susceptibility to crazing/cracking and dimensional stability are key to meeting 2 to 3 year shelf life requirements (product/propellant) in plastic aerosol containers.

PEF aerosol containers can be recycled along with PET. Alternatively, a separate recycling stream may be set up for PEF. It is desirable for aerosol containers to be recyclable, particularly in North America and other developed countries, where substantial recycling infrastructure exists. For example, several States in the U.S. (e.g. California and Oregon) require consumer goods companies to make their bottles recyclable.

The benefits of PEF (homopolymer/copolymer) may also be delivered by physical blending or compounding with PET/Bio-PET (both partial and fully renewable bio-PET). They can also be blended with recycled or regrind PET, which is either collected from a consumer recycling plant, typically called PCR, or it could be collected from an industrial recycling source in which case in which case it is typically called PIR. In some circumstances, PEF may be blended with petroleum-based PET. In a preferred embodiment, up to 25% recycled PET is included in the plastic package. Preferably, up to 25% recycled PET is blended into PEF. Alternatively, recycled PET is contained in a separate layer within the plastic package. In another alternative, if a separate PEF recycling stream is set up, the plastic package, base cup, cap, label and/or trigger could be made from up to 50% recycled PEF in a blended state or in a layered structure. Preferably, up to 100% of the plastic package, base cup, cap, label and/or trigger are made from PEF.

Enhanced barrier and physical properties may be obtained by physical blending or compounding/reactive compounding with poly(ethylene naphthalenate) (PEN). Additional barrier properties may be obtained by physical blending or compounding with nylon or liquid crystalline polymers (LCP). PEF may also be used in a multilayer structure to achieve enhanced passive barrier and/or physical properties with PET, PEN, EVOH, LCP, or nylon, or even polypropylene (PP) or polyethylene (PE), as those materials have decreased water transmission vs. PEF and could be incorporated into the structure either with or without the use of a tie layer. Enhanced barrier properties can also be obtained via the use of internal or external coatings of the plastic package. Such coatings include $SiO_2$, $SiO_x$, $Al_2O_3$, $AlO_x$, glass like, diamond like coatings, metallic coatings and carbon coatings.

The benefits of PEF may be enhanced by blending various compounds that can scavenge various molecules, such as oxygen, moisture, etc. An example of such a compound is farnesene, which can be used to scavenge oxygen. Farnesene blended into PET can also serve as scavenger for the aerosol compounds that enhance crazing in the current application.

At least one of the plastic package, base cup, cap, trigger or label of the present invention in any of the aspects can optionally include a colorant masterbatch, which can optionally turn the plastic package, base cup, cap, trigger or label opaque. As used herein, a "colorant masterbatch" refers to a mixture in which pigments are dispersed or dyes are dissolved, at high concentration, in a carrier material. The colorant masterbatch is used to impart color to the final product. In some embodiments, the carrier is a bio-based plastic or a petroleum-based plastic, while in alternative embodiments, the carrier is a bio-based oil or a petroleum-based oil. The colorant masterbatch can be derived wholly or partly from a petroleum resource, wholly or partly from a renewable resource, or wholly or partly from a recycled resource. Nonlimiting examples of the carrier include bio-derived or oil derived polyethylene (e.g., linear low-density polyethylene (LLDPE), low-density polyethylene (LDPE), high-density polyethylene (HDPE)), bio-derived oil (e.g., olive oil, rapeseed oil, peanut oil, soybean oil, or hydrogenated plant-derived oils), petroleum-derived oil, recycled oil, bio-derived or petroleum derived polyethylene terephthalate, polypropylene, and a mixture thereof. The pigment within the carrier, which can be derived from either a renewable resource or a non-renewable resource, can include, for example, an inorganic pigment, an organic pigment or dye, a polymeric resin, or a mixture thereof. Nonlimiting examples of pigments include titanium dioxide (e.g., rutile, anatase), copper phthalocyanine, antimony oxide, zinc oxide, calcium carbonate, fumed silica, phthalocyamine (e.g., phthalocyamine blue), ultramarine blue, cobalt blue, monoazo pigments, diazo pigments, acid dye, base dye, quinacridone, and a mixture thereof. In some embodiments, the colorant masterbatch can further include one or more additives, which can either be derived from a renewable resource or a non-renewable resource. Nonlimiting examples of additives include slip agents, UV absorbers, nucleating agents, UV stabilizers, heat stabilizers, clarifying agents, fillers, brighteners, process aids, perfumes, flavors, foaming agents, supercritical carbon dioxide, nitrogen, and a mixture thereof.

In some embodiments, color can be imparted to the plastic package, base cup, cap, trigger or label of the present invention in any of the aspects by using direct compounding (i.e., in-line compounding). In these embodiments, a twin screw compounder is placed at the beginning of the injection molding, blow molding, or film line and additives, such as pigments, are blended into the resin just before article formation.

Additional materials may be incorporated into the plastic package, base cup, cap, trigger or label of the present invention in any of the aspects to improve the strength or other physical characteristics of the plastic. Such additional materials include an inorganic salt, such as calcium carbonate, calcium sulfate, talcs, clays (e.g., nanoclays), aluminum hydroxide, $CaSiO_3$, glass fibers, glass spheres, crystalline silicas (e.g., quartz, novacite, crystallobite), magnesium hydroxide, mica, sodium sulfate, lithopone, magnesium carbonate, iron oxide, or a mixture thereof.

PEF provides additional benefits to the physical properties of the plastic package, base cup, cap, trigger or label of the present invention, since it has higher water resistance and oxygen resistance than PET.

Propellant

The aerosol products of the present invention may comprise a propellant that creates enough pressure to force the product from the canister for application. Products of the instant invention may have an internal package pressure from about 10 psig to about 135 psig. Pressure level may be controlled by the type and level of propellant used.

The propellant component of the aerosol products of the present invention may contain any known propellant that is compatible with the formulation and package of choice. Preferred propellants are generally in the form of liquefied gases when formulated into the aerosol products and include dimethylether, 1,1-difluoroethane, 1,1,1,2-tetrafluoroethane, butane, isobutane, propane, isopentane, pentane or combinations thereof. The total propellant concentration in the aerosol products of the present invention ranges from about 5% to about 99%, more typically from about 15% to about 90%, even more preferably from about 20% to about 70%, by weight of the composition. Other suitable propellants include nitrous oxide, and halogenated hydrocarbons such as trichlorofluoromethane, dichlorodifluoromethane, dichlorotetrafluoroethane trichlorotrifluoroethane, monochlorodifluoromethane, and combinations thereof. An example of a specific propellant that is suitable for the present invention is Honeywell Propellant HFO1234ze.

When a bag-on-valve system is used, the plastic package can be pressurized using any suitable gas. Preferably, an inert gas is used. Examples of useful inert gases include nitrogen, carbon dioxide, argon and air. In a preferred embodiment, the inert gas is nitrogen ($N_2$).

Package

FIG. 1 shows a side view of one embodiment of the present invention. The plastic package (10) has a delivery device (30) attached to a valve (20). The valve controls the flow of the aerosol product. PEF may be used to produce a plastic valve that can be glued or welded to the plastic package instead of a typical metal valve. The plastic package also has a base cup (40) and, optionally, a label (50). The plastic package may optionally include a cap. In addition, the plastic package may optionally include a trigger to improve the ergonomics of dispensing the aerosol product.

Figure 2:
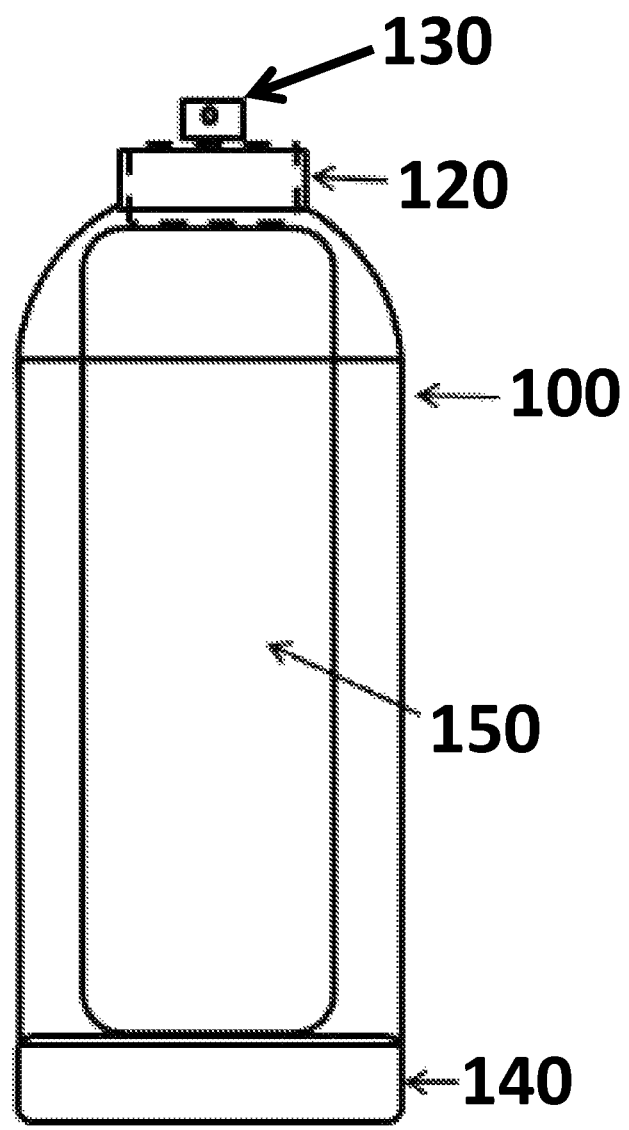
FIG. 2 is a side view of a second embodiment of the plastic package of the present invention.

FIG. 2 shows an alternative embodiment of the present invention. This embodiment uses a bag-in-can dispensing system (or BOV "bag on valve") inside the plastic package (100). This system separates the product from the pressurizing agent with a bag (150) attached to the valve (120). Product is dispensed through the delivery device (130). Preferably, the bag is hermetically sealed. The bag can be single layered or a multi-layered laminate. Preferably, the bag is made from a film (mono or multilayer construction) of PEF. This embodiment also includes a base cup (140). The plastic package may optionally include a cap. In addition, the plastic package may optionally include a trigger to improve the ergonomics of dispensing the aerosol product.

The aerosol products of the current invention are delivered from a total package comprising a delivery device, a valve to control flow and a stable plastic package that holds the product when sealed using said valve. The delivery device can be any known delivery device including but not limited to a button actuator and a porous sintered dome. Likewise, any known valve can be used that is capable of sealing the pressurized product within the plastic package and being easily opened and closed to control the release of the product to the delivery device. Both the delivery device and valve can be made of any material including but not limited to metal, plastic or glass.

The stable plastic package used in the instant invention can be made of any known plastic that is capable of containing the pressurized product and that does not interact with package in such a way that it alters the composition of the product or changes the appearance of the plastic or reduces the physical strength or dimensions of the package, or reduces the ability of package to contain the pressurized product. The package can be made of any known plastic that can be shaped or molded into a bottle and sealed with a valve. Suitable plastics include polymers or copolymers of PEF, PET, polyester, polyamide, polycarbonate, polyoxymethylene, polyacrylonitrile, polyolefin, or fluoropolymers and other plastics suitable for molding into a container. It is preferred in this invention that that the package material be PEF.

Methods

A. Containers

The containers of the invention can be produced using blow molding. Blow molding is a manufacturing process by which hollow plastic parts are formed from thermoplastic materials. The blow molding process begins with melting down thermoplastic and forming it into a parison or preform. The parison is a tube-like piece of plastic with a hole in one end through which compressed air can pass. Pressurized gas, usually air, is used to expand the parison or the hot preform and press it against a mold cavity. The pressure is held until the plastic cools. After the plastic has cooled and hardened the mold opens up and the part is ejected.

There are three main types of blow molding: extrusion blow molding, injection blow molding, and injection stretch blow molding. In extrusion blow molding, a molten tube of plastic is extruded into a mold cavity and inflated with compressed air. One end of the cylinder is pinched closed. After the plastic part has cooled, it is removed from the mold. These containers can be single layer or multilayer.

Injection blow molding (IBM) involves three steps: injection, blowing and ejection. First, molten polymer is fed into a manifold where it is injected through nozzles into a hollow, heated preform mold. The preform mold forms the external shape of the resulting container and is clamped around a mandrel (the core rod) which forms the internal shape of the preform. The preform consists of a fully formed bottle/jar neck with a thick tube of polymer attached, which will form the body. The preform mold opens and the core rod is rotated and clamped into the hollow, chilled blow mold. The core rod opens and allows compressed air into the preform, which inflates it to the finished article shape. After a cooling period the blow mold opens and the core rod is rotated to the ejection position. The finished article is stripped off the core rod and leak-tested. Injection blow molding, as well as the other blow molding methods described herein, is useful for the formation of article components that have embedded biodegradable polymer. Injection blow molding can be used to produce containers that include blends of biodegradable polymers.

Injection stretch blow molding (ISBM) is a method for producing a plastic container from a preform or parison that is stretched in both the hoop direction and the axial direction when the preform is blown into its desired container shape. In the ISBM process, a plastic is first molded into a "preform" using the injection molding process. These preforms are produced with the necks of the containers, including threads. The preforms are packaged, and after cooling, fed into a reheat stretch blow molding machine. The preforms are heated above their glass transition temperature, then blown using high pressure air into containers using metal blow molds. Typically, the preform is stretched with a core rod as part of the process. Injection stretch blow molding can be used to produce containers of the present invention.

Preferably, the container of the present invention is a bottle. In one embodiment, the bottles of the present invention are formed from virgin PEF, recycled/regrind versions of PEF, virgin PET, recycled versions of PET, or regrind versions of these materials. Bio-based forms of PEF and PET, whether virgin, recycled, or regrind, are also useful materials for use in the present invention. In a preferred embodiment, plastic package is formed from PEF.

B. Base Cup

The base cup of the invention can be formed using injection molding or thermoforming Injection molding is a manufacturing process for producing parts from thermoplastic materials, thermosetting plastic materials, or a mixture thereof. During injection molding, polymeric material is fed into a barrel, mixed, formed into a melt, and forced into a three-dimensional mold cavity where it solidifies into the configuration of the mold cavity via cooling, heating, and/or chemical reaction. Injection molding can be used to make a single layer base cup or a multilayer base cup. The base cup can be formed from a variety of materials, including PEF, PET, PP and PE. Preferably, the base cup is thermoformed and the base cup material is formed from virgin PEF, recycled/regrind versions of PEF, virgin PET, recycled versions of PET, or regrind versions of these materials. Bio-based forms PEF and PET, whether virgin, recycled or regrind, are also useful materials for use in the present invention. In a preferred embodiment, the base cup material is formed from PEF.

C. Labels

The labels of the invention can be formed using film extrusion. In film extrusion, thermoplastic material is melted and formed into a continuous profile. In some embodiments, multilayer films are coextruded. Film extrusion and coextrusion can be performed by any method known to one skilled in the art. The film layers may be formed from a variety of materials, including PEF, PET, PP and PE. Preferably, one or more of the film layers are formed from virgin PEF, recycled/regrind versions of PEF, virgin PET, recycled versions of PET, or regrind versions of these materials. Bio-based forms of PEF and PET, whether virgin, recycled or regrind, are also useful materials for use in the present invention. In a preferred embodiment, the label is formed from PEF. The labels of the present invention may be applied using a pressure sensitive adhesive or using a shrink label.

D. Cap

The cap of the present invention can be formed using injection molding or thermoforming Injection molding can be used to make single layer caps or multilayer caps. The cap may be formed from a variety of materials, including PEF, PET, PP and PE. Preferably, the cap is thermoformed and the cap material is formed from virgin PEF, recycled/regrind versions of PEF, virgin PET, recycled versions of PET, or regrind versions of these materials. Bio-based forms PEF and PET, whether virgin, recycled or regrind, are also useful materials for use in the present invention. In a preferred embodiment, the cap material is formed from PEF.

E. Trigger

The plastic package may optionally include a trigger to activate dispensing of the aerosol product. The trigger of the present invention can be formed using injection molding or thermoforming. Injection molding can be used to make triggers. The trigger may be formed from a variety of materials, including PEF, PET, PP and PE. Preferably, the trigger is thermoformed and the trigger material is formed from virgin PEF, recycled/regrind versions of PEF, virgin PET, recycled versions of PET, or regrind versions of these materials. Bio-based forms PEF and PET, whether virgin, recycled or regrind, are also useful materials for use in the present invention. In a preferred embodiment, the trigger is formed from PEF.

Determining Physical Properties

Barrier properties may be directly obtained via Water Vapor Transmission Rate (WVTR; ASTM F-1249) and Oxygen Transmission Rate (OTR; ASTM D3985) measurements. Physical properties may be determined by Tensile (ASTM D638), Flexural Modulus (ASTM D790), and Heat Deflection (ASTM D648) measurements. Environmental Stress Crack Resistance is determined by placing ASTM Izod bars or parts cut out of bottles, under strain, in headspace or direct contact with product, followed by optical/SEM/TEM characterization. Creep Resistance is determined by placing ASTM Type V dogbones, under stress, in headspace or direct product contact and measuring dimensional change along the gauge length.

Bio-based content can be measured directly using ASTM D6866. Absolute failure of the package is determined via drop testing in a safe enclosure—this test determines the resistance of the overall package to physical cracking. Pressure loss due to loss of the propellant through the walls of the package can be measured via a pressure gauge. Recyclability can be determined for a typical North American recycler, by following the approved tests provided by the APR—Association of Plastics Recyclers; in Europe the European Recycling Association has a separate set of tests which can be performed by various organizations such as PTI Europe and WRAP UK.

A measure of the LCA of a material can be determined via the standard ISO LCA method (ISO 14040).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A plastic package for dispensing a product in aerosol form comprising a bottle having a delivery device, a valve to control flow, and a stable plastic package that holds the product when sealed using said valve, wherein at least a portion of said stable plastic package comprises poly(ethylene 2,5-furandicarboxylate) (PEF).

2. The plastic package of claim 1, further comprising a bag connected to said valve, wherein said bag contains the product, and further, wherein the product is a liquid, gel, suspension, solution, paste, or foam.

3. The plastic package of claim 2, wherein said bag comprises PEF.

4. The plastic package of claim 1, wherein said bottle has a neck region and said neck region comprises PEF.

5. The plastic package of claim 1, wherein said plastic package further comprises a base cup and said base cup comprises PEF.

6. The plastic package of claim 1, wherein said plastic package further comprises a label and said label comprises PEF.

7. The plastic package of claim 1, wherein said plastic package further comprises a cap and said cap comprises PEF.

8. The plastic package of claim 1, wherein said plastic package further comprises a trigger and said trigger comprises PEF.

9. The plastic package of claim 1, wherein said product contains a propellant, wherein said propellant is selected from the group consisting of 1,1-difluoroethane, 1,1,1,2-tetrafluoroethane, butane, isobutane, propane, isopentane, pentane, nitrous oxide, or combinations thereof.

10. The plastic package of claim 2, wherein the plastic package is pressurized using an inert gas.

11. The plastic package of claim 10 wherein the inert gas is selected from the group consisting of nitrogen, carbon dioxide, argon, air, and combinations thereof.

12. The plastic package of claim 1, wherein said package is substantially clear.

13. The plastic package of claim 12, wherein said plastic package further comprises strengthening materials selected from the group consisting of glass fibers, glass spheres, and mixtures thereof.

14. The plastic package of claim 1 wherein from about 10% to 100% of the plastic package comprises bio-based content.

15. The plastic package of claim 1, wherein the PEF is blended with farnesene.

16. The plastic package of claim 1 wherein said package is made from a blend of PEF and one or more other materials selected from the group consisting of Poly(ethylene terephthalate) (PET), polyester, polyamide, polycarbonate, polyoxymethylene, polyacrylonitrile, polyolefin, fluoropolymers, virgin, recycled and regrind versions of all these polymers, and combinations thereof.

17. The plastic package of claim 1 wherein said bottle is formed from multiple layers of polymer material.

18. The plastic package of claim 17 wherein said at least one of said multiple layers is a barrier material.

19. The plastic package of claim 1 wherein said bottle comprises one or more colored pigments or dyes.

20. A plastic package for dispensing a product in aerosol form comprising a bottle having a delivery device, a valve to control flow, a stable plastic package, and a bag inside said stable plastic package, wherein the bag holds the product to be dispensed, and further wherein said bag comprises PEF.

21. The plastic package of claim 1 wherein at least a portion of said bottle is resistant to crazing.

22. The plastic package of claim 4 wherein at least said neck region of said bottle is resistant to crazing.

* * * * *